US012566826B2

(12) United States Patent
Wolf et al.

(10) Patent No.: US 12,566,826 B2
(45) Date of Patent: Mar. 3, 2026

(54) DETERMINING CONNECTIONS BETWEEN SOUND RECORDINGS AND COMPOSITIONS

(71) Applicant: Google LLC, Mountain View, CA (US)

(72) Inventors: Stanley Wolf, Palo Alto, CA (US);
Colby Ranger, Millbrae, CA (US);
Harris Cohen, Burlingame, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/608,821

(22) Filed: Mar. 18, 2024

(65) Prior Publication Data

US 2024/0378266 A1     Nov. 14, 2024

Related U.S. Application Data

(63) Continuation of application No. 16/627,969, filed as application No. PCT/US2017/065926 on Dec. 12, 2017, now Pat. No. 11,934,492.

(51) Int. Cl.
| | |
|---|---|
| *G06F 16/00* | (2019.01) |
| *G06F 16/683* | (2019.01) |
| *G06F 21/10* | (2013.01) |

(52) U.S. Cl.
CPC .......... *G06F 21/105* (2013.01); *G06F 16/683* (2019.01)

(58) Field of Classification Search
CPC ..... G06F 21/105; G06F 16/683; G06Q 50/01; G06Q 10/10
See application file for complete search history.

(56) References Cited

U.S. PATENT DOCUMENTS

| | | | | |
|---|---|---|---|---|
| 9,489,397 B1 * | 11/2016 | Olson | .................... | G06Q 40/08 |
| 2014/0046887 A1 * | 2/2014 | Lessin | .................... | G06N 5/047 |
| | | | | 706/46 |
| 2015/0039620 A1 * | 2/2015 | Ning | .................. | G06F 16/4387 |
| | | | | 707/740 |
| 2017/0109504 A1 * | 4/2017 | Ochmanek | .......... | H04L 67/1095 |
| 2018/0174093 A1 | 6/2018 | Perez | | |

OTHER PUBLICATIONS

International Search Report and Written Opinion for International Application No. PCT/US2017/065926, mailed May 4, 2018, 9 Pages.

* cited by examiner

*Primary Examiner* — Paul Kim
(74) *Attorney, Agent, or Firm* — Lowenstein Sandler LLP

(57) ABSTRACT

Implementations disclose determining connections between sound recordings and compositions. A method includes maintaining, by a server device of a content sharing platform, a serving structure to represent resources comprising sound recording resources and composition resources and explicit connections between the resources, identifying inferred connections between the resources based on data comprised in the resources of the serving structure, and upon receiving a user approval of at least one of the inferred connections, adding, by the server device, the at least one of the inferred connections to the serving structure.

20 Claims, 8 Drawing Sheets

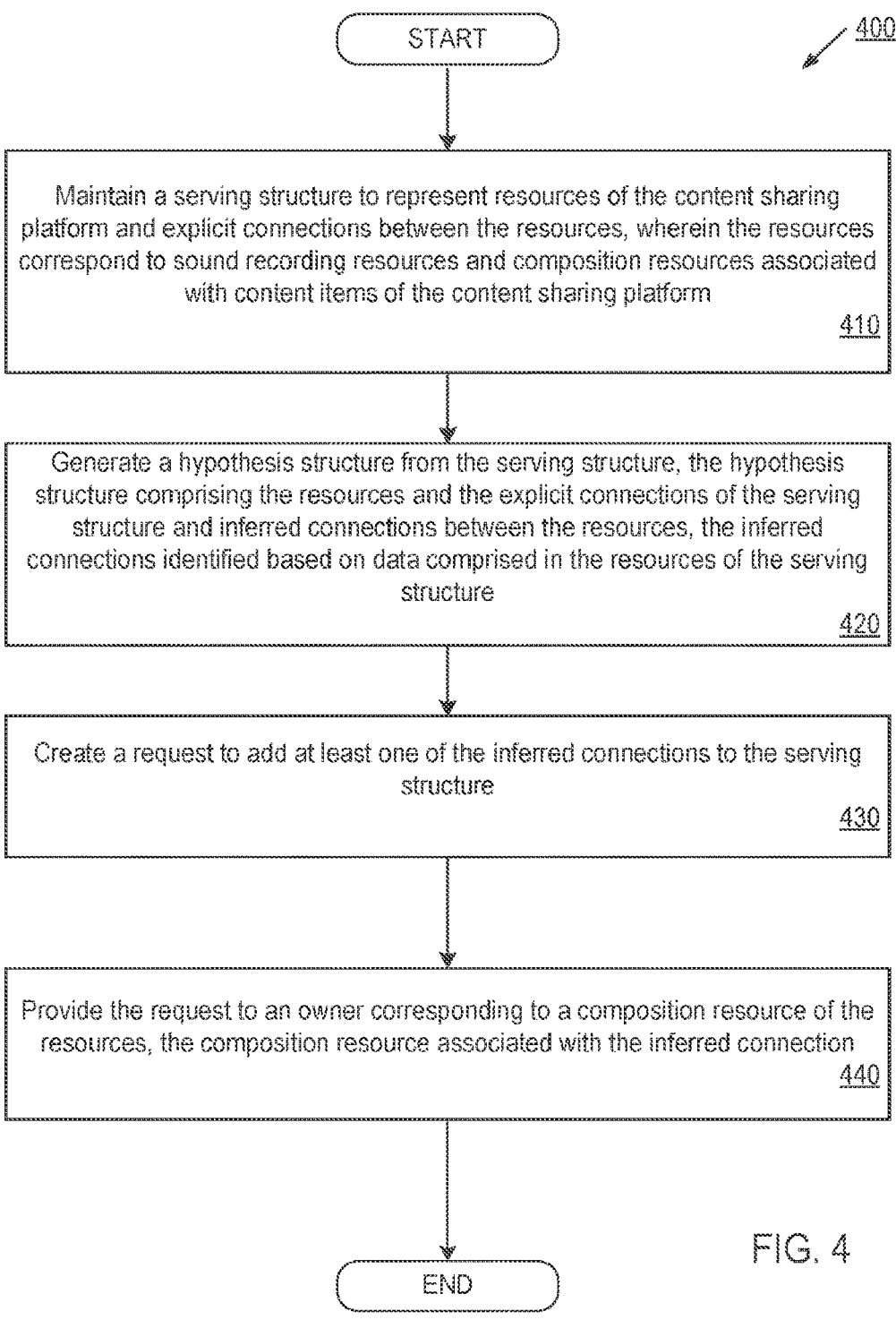

START

400

Maintain a serving structure to represent resources of the content sharing platform and explicit connections between the resources, wherein the resources correspond to sound recording resources and composition resources associated with content items of the content sharing platform

410

Generate a hypothesis structure from the serving structure, the hypothesis structure comprising the resources and the explicit connections of the serving structure and inferred connections between the resources, the inferred connections identified based on data comprised in the resources of the serving structure

420

Create a request to add at least one of the inferred connections to the serving structure

430

Provide the request to an owner corresponding to a composition resource of the resources, the composition resource associated with the inferred connection

440

END

FIG. 4

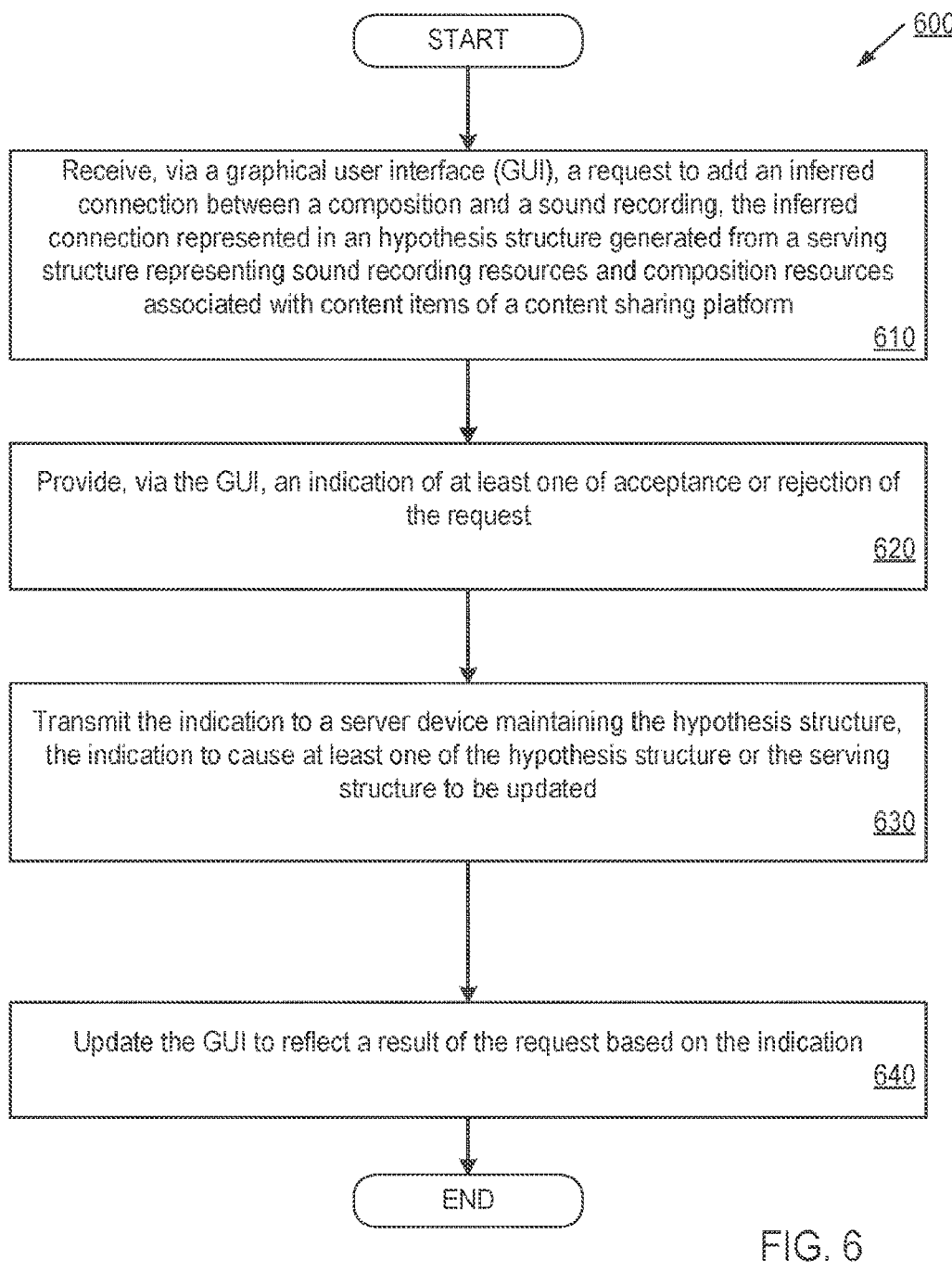

START

600

Receive, via a graphical user interface (GUI), a request to add an inferred connection between a composition and a sound recording, the inferred connection represented in an hypothesis structure generated from a serving structure representing sound recording resources and composition resources associated with content items of a content sharing platform

610

Provide, via the GUI, an indication of at least one of acceptance or rejection of the request

620

Transmit the indication to a server device maintaining the hypothesis structure, the indication to cause at least one of the hypothesis structure or the serving structure to be updated

630

Update the GUI to reflect a result of the request based on the indication

640

END

FIG. 6

DETERMINING CONNECTIONS BETWEEN SOUND RECORDINGS AND COMPOSITIONS

RELATED APPLICATIONS

This application is a continuation application of co-pending U.S. patent application Ser. No. 16/627,969, filed Dec. 31, 2019, which is a 371 application of International Application No. PCT/US2017/065926, filed Dec. 12, 2017, each of which is incorporated herein by reference.

TECHNICAL FIELD

This disclosure relates to the field of content sharing platforms and, in particular, to determining connections between sound recordings and compositions. These connections may be used, for example, in controlling access to items on a content sharing platform.

BACKGROUND

Content delivery platforms (also referred to as content sharing platforms), allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes maintaining, by a server device of a content sharing platform, a serving data structure (also referred to as a "serving structure" to represent resources comprising sound recording resources and composition resources and explicit connections between the resources, generating a hypothesis data structure (also referred to as a "hypothesis structure") from the serving data structure, the hypothesis data structure comprising the resources and the explicit connections of the serving data structure and inferred connections between the resources, the inferred connections identified based on data comprised in the resources of the serving data structure, and upon receiving a user approval of at least one of the inferred connections, adding, by the server device, the at least one of the inferred connections to the serving data structure. (The term "hypothesis data structure" is used because this data structure includes, in addition to the explicit connections between the resources, inferred (or hypothesised) connections between resources.) In an implementation the method may further include controlling access to the sound recording resources and/or to the composition resources based on the updated serving data structure (where the "updated serving data structure" is the data structure obtained after addition of the at least one of the inferred connections to the serving data structure).

In one implementation, the resources include a container storing at least one of metadata, reference material, ownership information, or policies that correspond to the content items of the content sharing platform. In addition, the serving structure may comprise a graph data structure, and the explicit connections of the serving structure may be approved by owners of the resources of the content sharing platform. Furthermore, the hypothesis structure may include a graph data structure.

In another implementation, a request to approve the inferred connection is automatically accepted on behalf of the owner after expiration of a determined time period. Additionally, a feature implementing automatic acceptance of the request and the determined time period can be configured via input received from a user device of the owner. In some implementations, the method can include receiving, from a user device of the owner, the approval of the inferred connection, and updating the serving structure to comprise the inferred connection as an explicit connection in the serving structure.

The method may also include creating, based on the hypothesis structure, a request to remove one of the explicit connections from the serving structure, providing the request to another owner corresponding to the resources associated with the one of the explicit connections proposed to be removed from the serving structure, receiving approval of the request, and updating, responsive to receiving the approval of the request, the serving structure to remove the one of the explicit connections.

Furthermore, the method may further include applying a W pattern to the hypothesis structure to identify the inferred connections. In addition, the method may further include applying machine learning to the hypothesis structure to identify the inferred connections. In one implementation, generating the hypothesis structure includes utilizing metadata from the resources to determine whether to create the inferred connections in the hypothesis structure, the metadata comprising at least one of a title, a writer name, an industry identifier, or an ownership identifier.

In another aspect of the disclosure, a method comprises, at a processing device, receiving, via a graphical user interface (GUI), a request to add an inferred connection between a composition and a sound recording, the inferred connection represented in a hypothesis structure generated from a serving structure representing sound recording resources and composition resources associated with content items of a content sharing platform; providing, via the GUI, an indication of at least one of acceptance or rejection of the request; transmitting the indication to a server device maintaining the hypothesis structure, the indication to cause at least one of the hypothesis structure or the serving structure to be updated; and updating the GUI to reflect a result of the request based on the indication.

In one implementation, the resources may comprise a container storing at least one of metadata, reference material, ownership information, or policies that correspond to the content items of the content sharing platform. In one implementation the serving structure may comprises a graph data structure, and the explicit connections of the serving structure may be approved by owners of the resources of the content sharing platform. Additionally or alternatively the hypothesis structure may comprise a graph data structure. In one implementation the request is automatically accepted on behalf of the owner after expiration of a determined time period.

Computing devices for performing the operations of the above described method and the various implementations described herein are also disclosed. Computer-readable media that store instructions for performing operations associated with the above described method and the various implementations described herein are also disclosed. For example, another aspect of the disclosure provides a client device comprising: a memory; and a processing device coupled to the memory, wherein the processing device is configured to perform operations comprising a method according to any aspect or implementation described herein. A further aspect of the disclosure provides a machine-readable storage medium (which may be a non-transitory machine-readable storage medium, although this aspect is not limited to this) storing instructions which, when executed, cause a processing device to perform operations comprising a method according to any aspect or implementation described herein. A further aspect of the present disclosure provides a method of controlling access to resources on a content sharing platform, the method comprising generating a serving data structure for the content sharing platform by a method according to any aspect or implementation described herein according; and controlling access to resources on the content based on the serving data structure.

BRIEF DESCRIPTION OF THE DRAWINGS

The disclosure is illustrated by way of example, and not by way of limitation, in the figures of the accompanying drawings.

FIG. 4 is a flow diagram illustrating a method for determining connections between sound recordings and compositions, according to an implementation.

FIG. 6 is a flow diagram illustrating a method for receiving a sound recording to composition connection request at a user device, according to an implementation.

DETAILED DESCRIPTION

Figure 1:
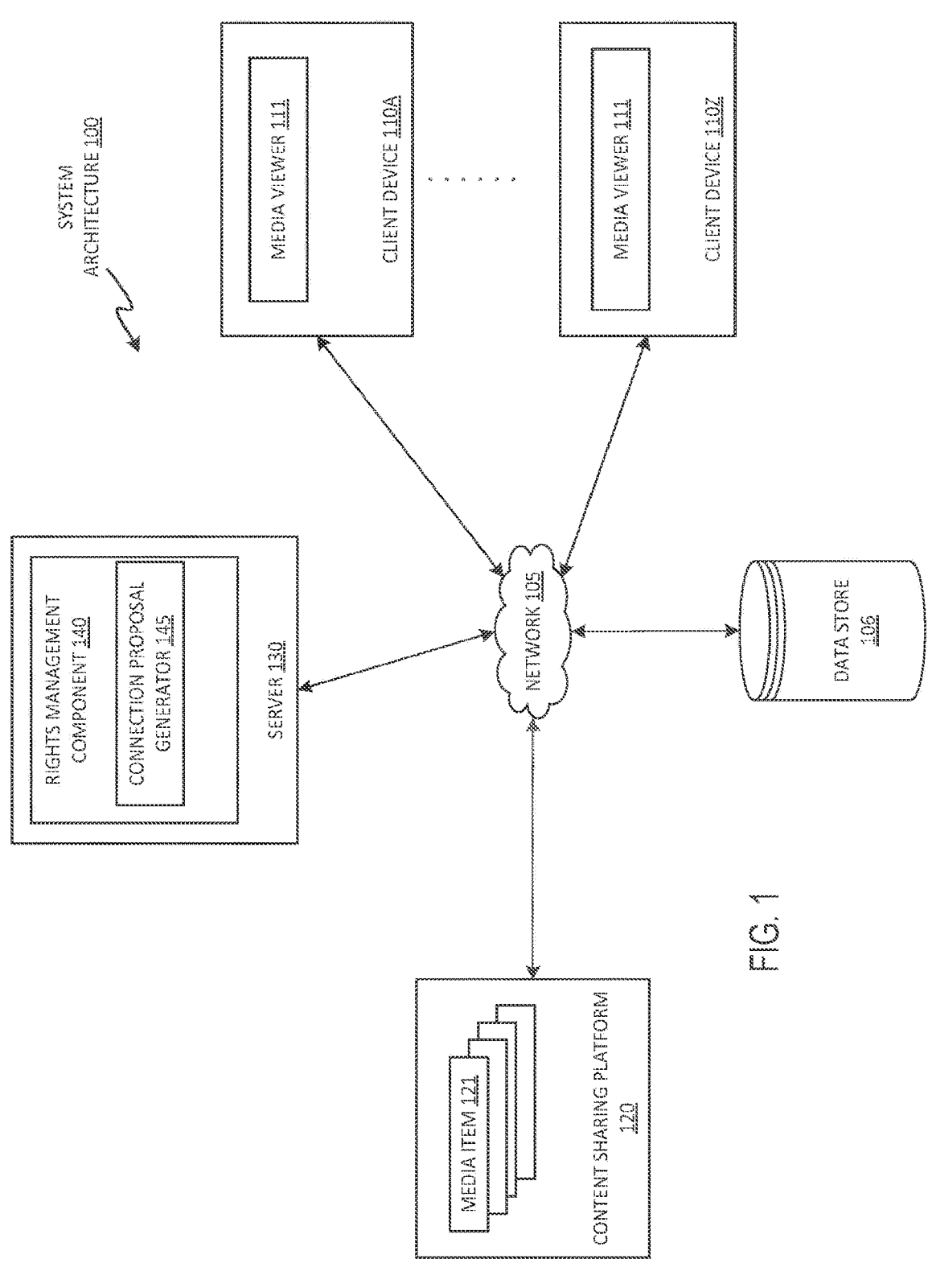
FIG. 1 is a block diagram illustrating an exemplary network architecture in which implementations of the disclosure may be implemented.

Aspects and implementations of the disclosure are directed to determining connections between sound recordings and compositions, for example for use in control of access. In rights management systems (such as those utilized by content sharing platforms), a single work, idea, invention, design, etc. can have multiple, different owners. For example, the composer, publisher, and music label are just some of the many different owners that may have different rights to a song recording and each owner may be entitled to at least partially control the use of their work in force in a particular territory. Videos often have multiple layers of ownership complexity, including rights regarding music played along with the video and rights associated with video content derived from other works (e.g., a composition performed in the video).

Content sharing platforms can utilize a data structure to organize and indicate connections between resources (e.g., sound recordings, compositions, film, TV show, video, book, article, other artistic or creative work, etc.) and resource owners associated with content items delivered by the content sharing platform. A resource may refer to a discrete item, for example represented as a data object, which can be associated with the ownership rights of one or more owners. For example, a resource may refer to container (e.g., a class, a data structure, or an abstract data type (ADT) whose instances are collections of other objects: containers store objects in an organized way that follows specific access rules) for metadata, reference material, ownership information, and policies, which are all connected with a specific piece of content (e.g., a media content item of a content sharing platform). In a content sharing platform, a media content item may be associated with a number of these resources and corresponding resource owners. In conventional systems, each resource is associated with a single data object containing all known information concerning the ownership rights of that resource.

For example, the data structure may include resources for compositions and sound recordings. A composition may refer to an original piece of music, either a song or an instrumental music piece, the structure of a musical piece, or the process of creating or writing a new song or piece of music. For example, a composition may include the harmony, melody, form, rhythm, timbre, lyrics, and orchestration of a song. A sound recording may refer to a specific performance of a composition. For a composition resource representing a composition, the data structure of the conventional systems may include a single data object representing the composition resource. This data object for the composition resource reflects pertinent identifying information of the composition (e.g., title, industry identifiers, etc.), as well as each owner of the composition (there may be multiple owners) and each owner's share (33% ownership, etc.) in each territory (e.g., country, jurisdiction, etc.) associated with the composition.

While this data structure modeling of the conventional systems allows for information about a resource to be centralized (as all owners of the resource can contribute information to the single data object), it also results in inaccuracies and inefficiencies. Conflicting or incorrect data about the resource can be incorporated into the single data object in a way that is not easily remedied. For example, one owner of a composition resource may incorrectly provide ownership information as being associated with a first sound recording resource, when this ownership information should have been associated with a second different sound recording resource instead. As another example, an owner of a composition resource might provide ownership information in a first sound recording resource that is correct, but insufficiently distinguishing so as to disambiguate between different aspects of the resources' ownership. As another example, two different owners associated with the same composition resource may both provide incorrect information versus some unknown objective truth, where the provided information is contradictory between the two different owners.

Not only is validating and correcting such incorrect inputted data for a data object in the data structure difficult, but the incorrect data can result in the creation of inaccurate connections between resources in the data structure of the conventional system. If such a conventional system has a single data object per resource in the data structure, incorrect information may cause a merge to occur between the two resources. This merge may be performed to infer composition ownership that was not explicitly identified by an owner. Once the merge is complete, it can be difficult to back out of such a merge, as it is challenging to determine which information should be associated with which resource once the mistake is discovered. Manual review of records to reverse the error is laborious and time consuming, and has no guarantee of success.

One approach used by conventional systems to address at least a portion of the complex structure of ownership in the data structure of the content sharing platform is to model every sound recording resource in the data structure as though it has its own embedded composition resource. Using this model, owners of compositions can be asked to explicitly identify each sound recording resource maintained in the data structure that embodies each of the owner's compositions. As such, merging of composition resources in the data structure (to infer composition ownership that was not explicitly identified by an owner) can be avoided.

However, even such structuring of sound recording resources with embedded compositions based on explicit owner-provided information can lead to inaccuracies and missing information in the data structure of the content sharing platform. For example, utilization of explicit owner identification of the sound recordings that should embed the owner's compositions can result in missed connections between sound recordings and compositions, as a composition owner may not be aware of all of the sound recording resources in the content sharing platform that may embody the composition. Furthermore, errors can still result from incorrect information and connections mistakenly inputted by an owner of a composition.

Aspects of the disclosure address the above-mentioned and other challenges by providing a rights management component that includes a connection proposal generator to assist owners in providing data for the connections between sound recording resources and compositions. The connection proposal generator proposes potential connections (i.e., links or relationships) between sounds recordings and compositions in a data structure based on existing connections explicitly identified by owners and other signals garnered from data of the resources of the data structure. The connection proposal generator may provide the proposed connection to the owners as a suggestion for acceptance as an explicit connection in the data structure. If the proposed connection is accepted, the rights management component can add the proposed connection as an explicit connection between sound recording and composition in the data structure of resources managed by the rights management component of the content sharing platform.

Accordingly, aspects of the disclosure provide technical solutions by which non-explicit (e.g., not directly identified or approved by an owner) connections between sound recordings and compositions in a data structure of resources managed by a content sharing platform can be inferred and proposed to owners of compositions. This results in more comprehensive ownership and rights data for the resources of the content sharing platform. Furthermore, this increases the reliability of content sharing platforms, and reduces or eliminates the inaccuracies and missing information in the data structure of the content sharing platform. The content sharing platform can thus make better and more-informed decisions regarding playability of content items and ownership of content items. By providing sound recording to composition connection proposals, aspects of the disclosure eliminate the need for additional operations to perform corrective actions when generating connections between compositions and sound recordings in a data structure of resources of the content sharing platform, thereby resulting in more efficient use of computing (processing) resources and in an improved user experience.

Implementations of the disclosure often reference videos for simplicity and brevity. However, the teaching of the disclosure are applied to media items generally and can be applied to various types of content or media items, including for example, video, audio, text, images, program instructions, etc.

Figure (FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for users to record, edit, and/or upload content for sharing on the content sharing platform, and implements sound recording to composition connection proposals for the content sharing platform. In some implementations, the content sharing platform provides a music streaming service, and the media viewer 111 is a music streaming services application that provides music content and implements sound recording to composition connection proposals as part of the music streaming service.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

Functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item,"

"content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a rights management component 140 to implement sound recording to composition connection proposals for the content sharing platform 120. In some implementations, rights management component 140 of server 130 may interact with content sharing platform 120 to provide implementations of the disclosure.

In one implementation, rights management component 140 allows owners (owner users of the content sharing platform 120) to submit information regarding their ownership of resources to the rights management component 140. A resource is a discrete item that can be associated with the ownership rights of one or more owners. For example, a resource may refer to a container (e.g., a class, a data structure, or an abstract data type (ADT) whose instances are collections of other objects; containers store objects in an organized way that follows specific access rules) for metadata, reference material, ownership information, and policies, which are all connected with a specific piece of content (e.g., media item (content item) 121 of content sharing platform 120).

Examples of types of resources include, but are not limited to, composition (such as of a song), sound recording, film, TV show, video, book, article, or other artistic or creative work. Resources can be incorporated into or be otherwise present in one or more content items 121 of the content sharing platform 120, both partially and in full. For example, a content item 121 can reproduce a resource or a portion of a resource, such as a content item reproducing a clip of a movie. Alternatively, a content item 121 can incorporate resources, for example a video including a song as background audio with overlapping dialogue.

In some cases, a single resource can be owned partially by multiple owners in a variety of ways. Examples includes, but are not limited to, partial ownership based on geographic region (territory) or media type, or based on a percentage ownership split. As owners provide additional information to the rights management component 140, the rights management component 140 can adapt its understanding of the ownership of resources based on new information. For example, the rights management component 140 allows owners, via client devices 110A-110Z, to describe resources and affiliated content items that they own rights to via a disclosure graphical user interface (GUI) presented on the client devices 110A-110Z.

The rights management component 140 further allows owners, via a GUI on a client device 110A-110Z, to disclose and assert their rights over resources incorporated into content items 121 associated with the content sharing platform 120. Owners may provide an indication or statement that a specific content item of the content sharing platform 120 comprises a resource owned by an owner or otherwise affects an owner's rights to a resource. Based on receiving such an indication from an owner, the rights management component 140 can associate a content item with a resource owned by that owner.

In some implementations, the content sharing platform 120 may take action based on requests from owners of resources associated with a content item. For example, the content sharing platform 120 can restrict a content item 121 from being displayed to some or all users based on a request by an owner associated with a resource included within the content item. The content sharing platform 120 is able to access rights information for resources associated with content items from the rights management component 140 to determine whether particular content items 121 are permitted to be presented to particular client devices 110A-110Z. The rights management component 140 can be integrated into the content sharing platform 120, connected to the content sharing platform 120 over the network 105, directly connected to the content sharing platform 120 (for example over an Ethernet connection), or otherwise connected to the content sharing platform 120 by any suitable method.

As discussed above, due to the large number of media content items 121 and the potentially complex structure of ownership rights for each content item 121, errors and inaccuracies in information about ownership rights can be common within the rights management component 140. To address this, the rights management component 140 may maintain a rights management data structure (e.g., stored in data store 106) to organize the resources of the content sharing platform 120 and to indicate connections between the resources and the resource owners. In particular, the data structure may model every sound recording resource in the data structure as though it has its own embedded composition resource. Using this model, owners of compositions can be asked to explicitly identify each sound recording resource maintained in the data structure that embodies each of the owner's compositions However, even such structuring of sound recording resources with embedded compositions based on explicit owner-provided information can lead to gaps and missing information in the data structure of the content sharing platform. For example, utilization of explicit owner identification of the sound recordings that should embed the owner's compositions can result in missed connections between sound recordings and compositions, as a composition owner may not be aware of all of the sound recording resources in the content sharing platform that may embody the composition. Furthermore, errors can still result from incorrect information and connections mistakenly inputted by an owner of a composition.

Aspects of the disclosure address the above-mentioned and other challenges by providing a rights management component 140 that includes a connection proposal generator 145 to assist owners in providing data for the connections between sound recording resources and compositions. The connection proposal generator 145 proposes potential connections (i.e., links or relationships) between sounds recordings and compositions in the data structure based on existing connections explicitly identified by owners and other signals garnered from data of the resources of the data structure. The connection proposal generator 145 may provide the proposed connection to the owners (at client device 110A-110Z) as a suggestion for acceptance as an explicit connection in the data structure. If the proposed connection is accepted, the rights management component 140 can add the proposed connection as an explicit connection between sound recording and composition in the data structure of resources managed by the rights management component of the content sharing platform. This results in a more comprehensive ownership and rights data for the resources of the content sharing platform 120. Further description of the rights management component 140 and connection proposal generator 145, as well as their specific functions, are described in more detail below with respect to FIG. 2.

Although implementations of the disclosure are discussed in terms of content sharing platforms and providing sound recording to composition connection proposals for the content sharing platform, implementations may also be generally applied to any type of social network providing connections between users. Implementations of the disclosure are not limited to content sharing platforms that provide channel subscriptions to users.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
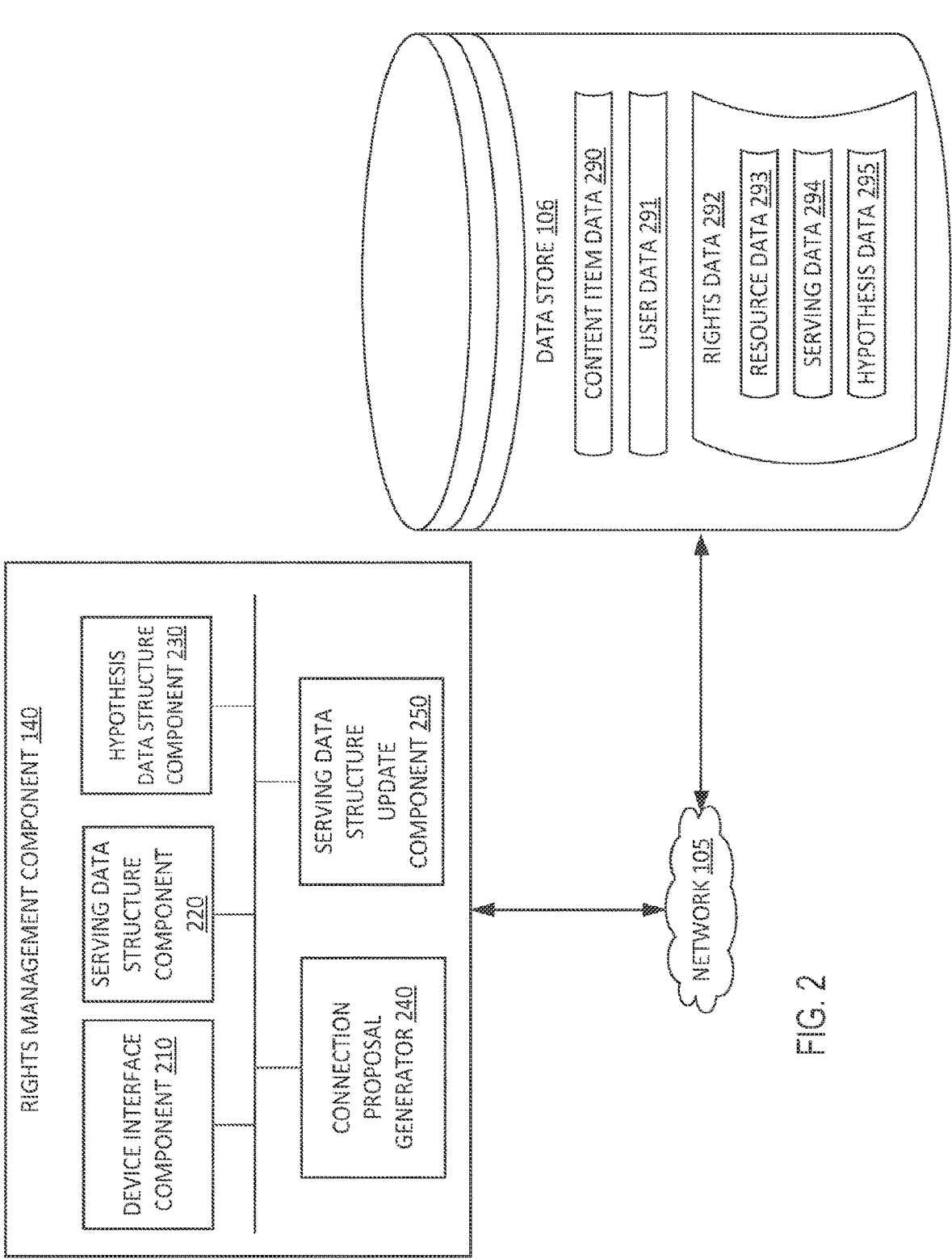
FIG. 2 is a block diagram of a rights management component, in accordance with an implementation of the disclosure.

FIG. 2 is a block diagram illustrating a rights management component 140 in accordance with one implementation of the disclosure. As discussed above, the rights manager component 140 may interact with a single network (for example content sharing platform, such as content sharing platform 120 or a social network), or may be utilized among multiple networks (e.g., provided as a service of a content sharing platform that is utilized by other third party networks such as social networks). In one implementation, the rights management component 140 includes a device interface component 210, a serving data structure component 220, a hypothesis data structure component 230, a connection proposal generator 240, and a serving data structure update component 250. In one implementation, connection proposal generator 240 is the same as connection proposal generator 145 described with respect to FIG. 1. More or less components may be included in the rights management component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The rights management component 140 is communicatively coupled to the data store 106. For example, the rights management component 140 may be coupled to the data store 106 via a network (e.g., via network 105 as illustrated in FIG. 1). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and rights data 292 (which may further include resource data 293, serving data 294, and hypothesis data 295).

As discussed above, the rights management component 140 enables providing sound recording to composition connection requests (proposals) for rights management in a content sharing platform according to implementations of the disclosure. As such, in implementations of the disclosure, the rights management component 140 proposes potential connections (i.e., links or relationships) between sounds recordings and compositions based on the existing connections explicitly identified by owners and other signals garnered from data of the resources.

The device interface component 210 allows the rights management component 140 to communicate with user devices (such as user device 110A-110Z of FIG. 1) and vice versa. Specifically, the device interface component 210 receives information describing asserted resources or claims from user devices. Similarly, the device interface component 210 transmits information about potential claims to one or more user devices. The device interface component 210 can receive and transmit information to user devices by any suitable method, such as through a website, through a dedicated software application, through email, or through any other suitable inter-device communication method.

The device interface component 210 also provides a graphical user interface (GUI) accessible to owners, for example through a user device, that allows an owner to view, update, or add to information about their associated asserted resources managed by the rights management component 140. The asserted resources may be maintained as part of rights data 292, specifically as resource data 293, in data store 106. As discussed above, a resource may refer to a container (e.g., a class, a data structure, or an abstract data type (ADT) whose instances are collections of other objects; containers store objects in an organized way that follows specific access rules) for metadata, reference material, ownership information, and policies, which are all connected with a specific piece of content (e.g., as stored in content item data 290 of data store 106). Examples of types of resources include, but are not limited to, composition (such as of a song), sound recording, film, TV show, video, book, article, or other artistic or creative work. Resources can be incorporated into or be otherwise present in one or more content items of the content sharing platform, both partially and in full.

The GUI provided by device interface component 210 allows owners to submit claims and displays proposals (such as the sound recording to composition proposals described herein) associated with the owner's resources to the owners. Generally, an owner is able to access or modify information provided by that owner, however other policies may apply. An owner interacts with individual asserted resources through the GUI on the user device. One or both of the owner and GUI uses the asserted resource IDs as a means for transacting with the right management component 140 regarding information to be added, updated, deleted, claims to be made, etc., The rights management component 140 can be configured so that even if the reconciled resource associated with an asserted resource is modified, split, merged, or changed, the asserted resource ID remains consistent, and the changes in the reconciled resource do not affect the owner's interaction with their associated asserted resource.

Once resource information is received via device interface component 210 and stored as resource data 293 in rights data 292, serving data structure component 220 generates and/or updates a serving data structure (also referred to herein as a serving structure) with the received resource information. The serving data structure maintained by serving data structure component 220 may represent resources and connections between resources that have been explicitly provided and/or approved by owners of the content sharing platform. As such, data, such as resources and connections, is represented in the serving data structure when an owner provides or approves this data (i.e., no inferred connections are represented in the serving data structure).

In one implementation, the serving data structure is used by the content sharing platform as a model of ownership rights and policies that are applied to content items of the content sharing platform. As such, playability of content items and/or payments associated with content items is based on the serving data structure maintained by the rights management component 140. The serving data structure may be maintained as serving data 294 of rights data 292 in data store 106.

The serving data structure may include a serving graph implemented as a graph data structure. A graph data structure may include structured information about a corpus of resources and relational connections between the corpus of resource, wherein the corpus of resource comprises the resources. A graph data structure may include a finite set of vertices (or nodes or points), together with a set of unordered pairs of these vertices for an undirected graph or a set of ordered pairs for a direct graph. These pairs are known as edges, arcs, or lines for an undirected graph and as arrows, directed edges, directed arcs, or directed lines for a direct graph. Different data structures may be used for the representation of graphs including, but not limited to, an adjacency list, an adjacency matrix, or an incidence matrix.

In some implementations, data structures other than a graph data structure may be used to represent the resources and connections of the content sharing platform in the serving data structure. For example, a table data structure may be implemented to represent the resources and connections between resources of the content sharing platform. Implementations of the disclosure are not limited to solely graph data structures. However, for case of explanation and simplicity, graph data structures are referenced in the description below.

Utilizing the serving data structure, the hypothesis data structure component 230 may generate a hypothesis data structure (also referred to herein as an hypothesis structure) that is used to infer additional connections between resources in the serving data structure. As discussed above, the serving data structure is generated based on the policy that owners of a composition resource should explicitly identify each sound recording resource that embodies the owner's composition in order to benefit from uses of that sound recording resource across the content sharing platform. Accordingly, the serving data structure illustrates those explicit connections between sound recordings and composition, and not connections that could be inferred from other data and information of the serving data structure. The hypothesis data structure component 230 is provided to generate a separate hypothesis data structure that can be used to identify inferred (non-explicit or not owner-identified) connections between sound recordings and compositions that can be used to increase comprehensiveness of the serving data structure.

In one implementation, the hypothesis data structure may include a hypothesis graph implemented as a graph data structure. In one implementation, the hypothesis data structure may be maintained as hypothesis data 295 in rights data of data store 106.

In one implementation, the hypothesis data structure component 230 may infer the additional connections in the hypothesis data structure using a variety of techniques. The inferred additional connections may be selected based on various data provided from primary data sources of the sound recording and composition resources, as well as from secondary data sources. The primary data examined by the hypothesis data structure component 230 may be metadata found in the composition resources themselves, such as a title, writers, industry identifiers for compositions (e.g., ISWC, HFA, etc.), industry identifiers for sound recordings (e.g., ISRC), and ownership, to name a few examples. The secondary data sources may include the sound recordings and sound recording owners, who can provide feedback on whether the composition is related to the sound recording (e.g., do the songs sound alike, similar metadata, etc.).

Figure 3:
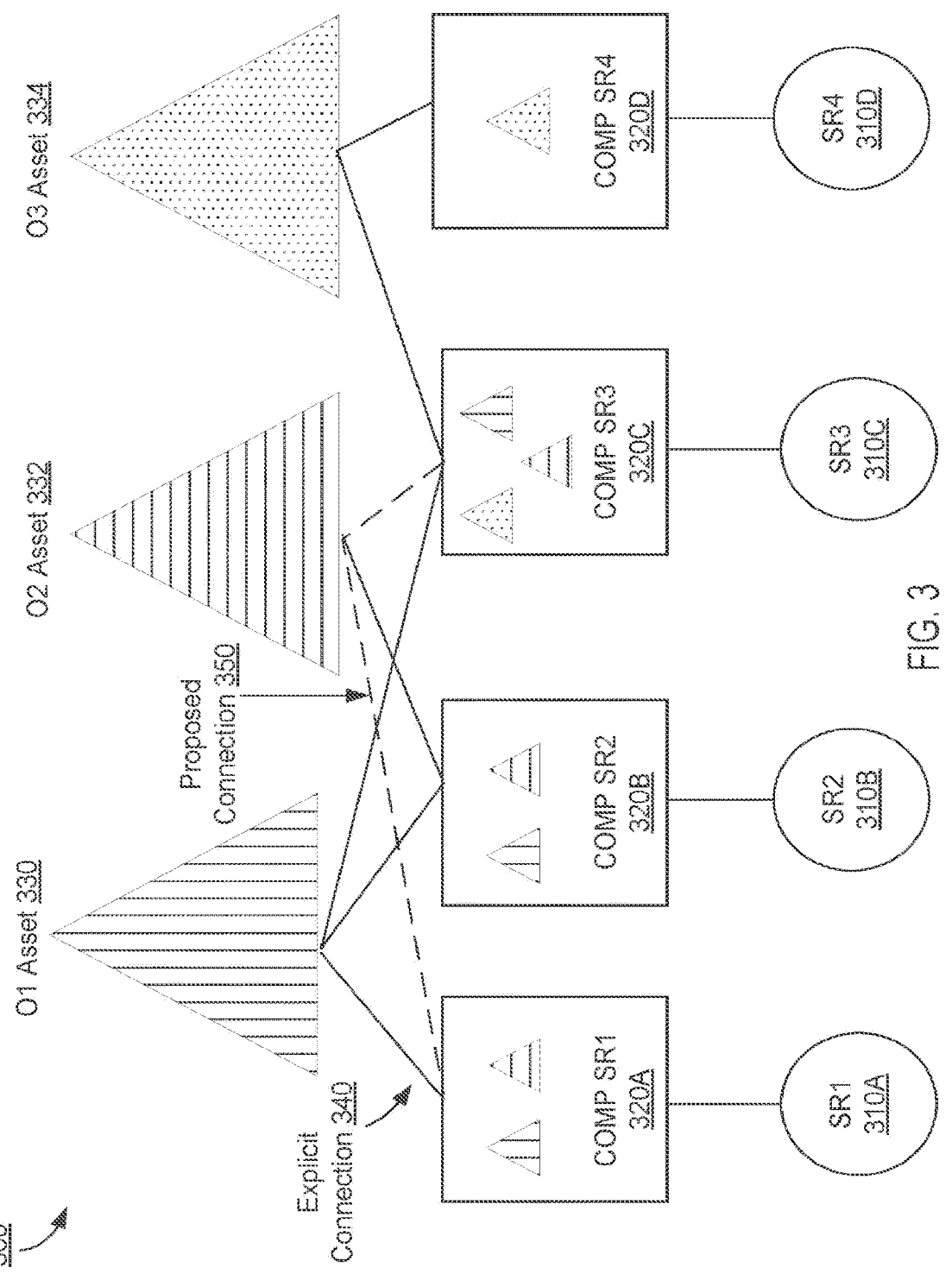
FIG. 3 is a block diagram of a hypothesis data structure for determining connections between sound recordings and compositions for a content sharing platform, according to implementations of the disclosure.

In one implementation, using the above noted data, the hypothesis data structure component 230 can apply a "W pattern" or "M pattern" to the generated hypothesis data structure to identify inferred connections between sound recordings and compositions. FIG. 3 is an example of application of a "W pattern" to a hypothesis data structure to identify inferred connections (also referred to as "proposed connections").

FIG. 3 is a block diagram illustrating at least a portion of hypothesis data structure 300 according to implementations of the disclosure. In one implementation, hypothesis data structure 300 is a hypothesis graph that is generated and maintained by rights management component 140 of FIGS. 1 and 2, and stored as hypothesis data 295 in data store 106. In hypothesis data structure 300, circles 310A-310D represent sound recordings, squares 320A-320D represent compositions, and triangles 330, 332, 334 represent ownership by a particular owner. In the hypothesis data structure 300, each sound recording 310A-310D includes one or more embedded compositions 320A-320D. The solid lines 340 represent an explicit (e.g., owner-provided or approved) link or connection that exists between an owner of a composition 320A-320D and a sound recording 310A-310D. The dashed lines 350 represent an inferred or proposed (not indicated by an owner) link or connection that exists between an owner of a composition 320A-320D and a sound recording 310A-310D.

The hypothesis data structure 300 of FIG. 3 illustrates some potential sound recording to composition connection proposals for the owner corresponding to the O2 resource 332. As shown in FIG. 3, O1 resource 330, which represents a first owner of a composition, and O2 resource 332, which represents a second owner of the composition, have explicitly established, via explicit connections 340, co-ownership of the composition COMP SR2 320B embedded in the sound recording SR2 310B, via asserted compositions resources 330, 332 (shown as embedded within COMP SR2 320B. The hypothesis data structure 300 may then infer proposed connections 350 between O2 resource 332 and both of COMP SR1 320A and COMP SR3 320C, which are the other sound recordings to which O1 resource 330 has been explicitly linked. This is an application of a "W pattern" or "M pattern", as the common explicit connections 340 of 2 or more owners are used to generate proposed connections 350 in a visual "W pattern" or "M pattern" format.

Furthermore, based on the hypothesis data structure 300, the hypothesis data structure component 230 of FIG. 2 may decide not to propose SR4 310D to the owner corresponding to the O2 resource 332, because this owner of the O2 resource 332 has not explicitly expressed agreement that O1 resource 330 and O2 resource 332 refer to the same composition. However, if the owner corresponding to the O2 resource 332 accepts the proposal of the proposed connection 350 to SR3 310C, then the hypothesis data structure component 230 has a better signal to support proposing SR4 310D to the owner corresponding to the O2 resource 332.

Based on the hypothesis data structure 300, the hypothesis data structure component 230 of FIG. 2 could also decide to propose SR4 310D to the owner corresponding to O1 resource 330, as well as SR1 310A and SR2 310B to the owner corresponding to the O3 resource 334.

The decision by the hypothesis data structure component 230 to infer connections between sounds recording and compositions (or, in some cases, to select an inferred connection for a proposal) may be based on signals corresponding to the primary and secondary data discussed above. For example, metadata provided by a composition resource of proposal recipient should be consistent with the other metadata provided by owners of embedded (explicitly) composition resources in the destination sound recording. For example, with reference to hypothesis data structure 300 of FIG. 3, the metadata of O2 resource 332 as compared to the metadata provided by O1 resource 330 and O3 resource 334 on the embedded compositions for SR 3 310C. In one example, the metadata of the composition resources may be compared to determine whether the industry identifiers for the compositions resources are the same, whether the writer names in the compositions resources are consistent, whether the titles provided by the composition resources are consistent, and so on.

In implementations of the disclosure, different techniques, other than the W pattern/M pattern, can be used for inferring connections between sound recording and compositions based on data in a hypothesis data structure. For example, as discussed above, machine learning may be applied to the hypothesis data structure to identify inferred connections between sound recordings and compositions. Machine learning may refer to a technique that provides computing devices the ability to learn without being explicitly programmed. Machine learning utilizes a machine learning model that may refer to a model artifact that is created by a training engine using training data that includes training inputs and corresponding target outputs (correct answers for respective training inputs). A training engine, which trains the machine learning model, may find patterns in the training data that map the training input to the target output (the answer to be predicted), and provide the machine learning model that captures these patterns. The machine learning model may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like.

Depending on the particular technique implemented by the hypothesis data structure component 230 to identify and/or selected inferred connections between sound recordings and compositions, more or less proposed connections 350 than illustrated in hypothesis data structure 300 in FIG. 3 may be inferred.

Referring back to FIG. 2, once the inferred connections are generated and/or selected by the hypothesis data structure component 230 from the hypothesis data structure, a proposal to an owner may be generated corresponding to these inferred connections. The rights management component 140 includes a connection proposal generator 240 to assist owners in providing data for the connections between sounds recording resources and compositions. The connection proposal generator 240 may generate and provide proposals for the selected inferred connections (i.e., a sound recording to composition connection proposal) from the hypothesis data structure to the owners. The proposal may include a suggestion for the owner to accept the proposed connection as an explicit link in the serving data structure.

Figure 7:
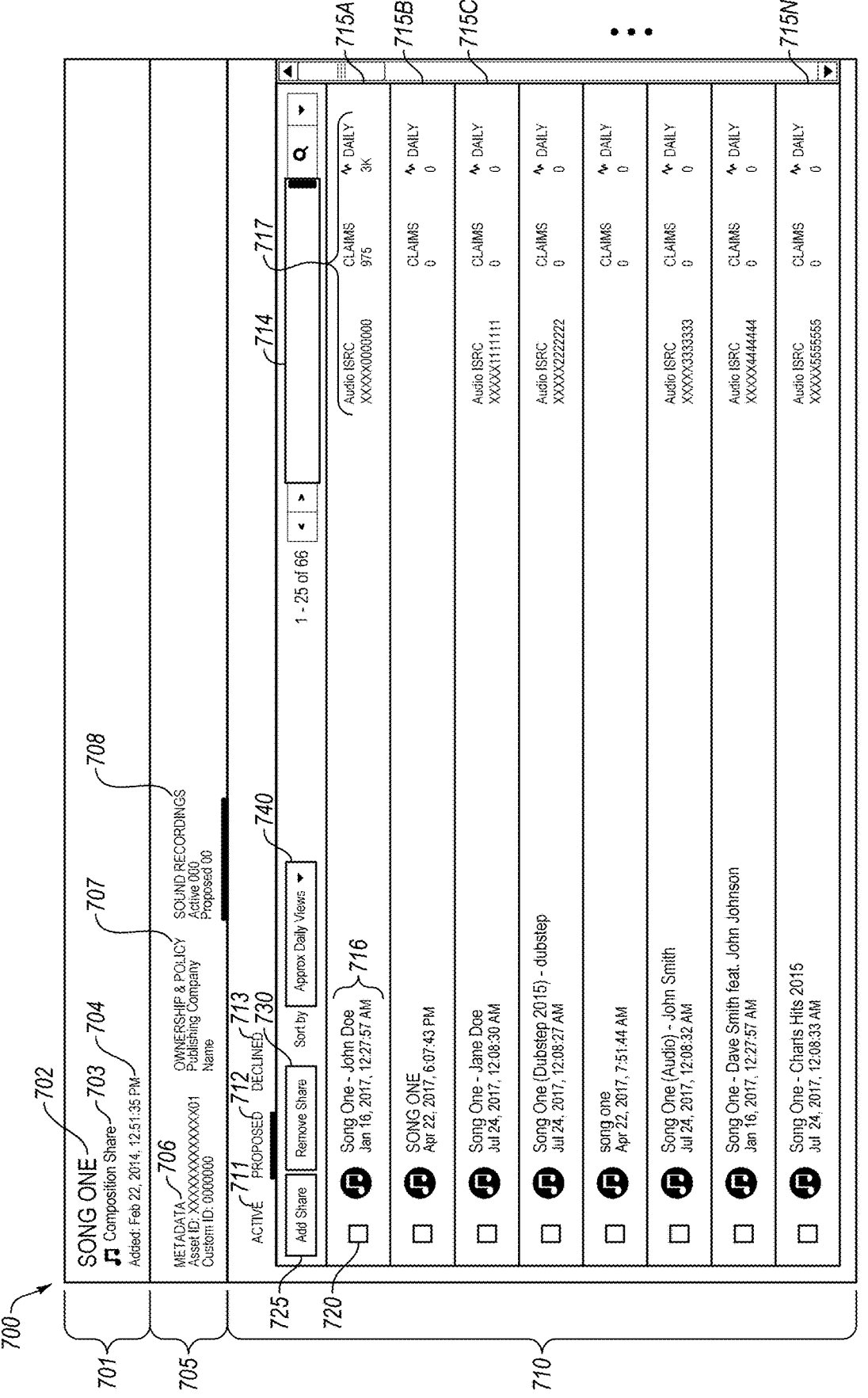
FIG. 7 is an exemplary screenshot of a UI for a sound recording to composition connection request for a content sharing platform, according to implementations of the disclosure.

If the proposed connection is accepted, the serving data structure update component 250 can add the proposed connection as an explicit connection between sound recording and composition in the serving data structure managed by the rights management component 140. This results in a more comprehensive ownership and rights data for the resources of the content sharing platform. In one implementation, the proposal is provided to the owner via a GUI. FIG. 7 described further below details one example of a GUI for a sound recording to composition connection proposal that may be provided by the connection proposal generator 240 to an owner. In other implementations, the proposal may be provided to the owner via other communication mediums, such as e-mail message, word processing document, spreadsheet (e.g., comma separated value (CSV) document, and so on.

If the proposed connection is rejected by the owner, then proposed connection is not added to the serving data structure and is also removed as an inferred connection from the hypothesis data structure. In both cases, the acceptance or the rejection by an owner is provided as feedback data that is input to the hypothesis data structure component for use in later generation and/or maintenance of the hypothesis data structure.

As some owners in a content sharing platform may receive a large number of proposals from the connection proposal generator 240, the connection proposal generator may provide an automatic acceptance feature in conjunction with the proposal. The automatic acceptance feature, when configured to be implemented by an owner, causes proposals sent to the owner to be automatically accepted by the connection proposal generator 240 on the owner's behalf after expiration of a determined time period (e.g., immediately, hours, days, weeks, etc.). The determined time period of the automatic acceptance feature may be configured by the owner. Furthermore, the automatic acceptance feature can be configured with varying levels of granularity, for example, by applying the automatic acceptance feature to those proposals that are associated with a determined level of accuracy confidence. For those proposals that do not satisfy the determined level of accuracy confidence, the connection proposal generator 240 may indicate in the proposal that the proposal should be manually reviewed by the owner.

In one implementation, the connection proposal generator 240 may also generate proposals to remove explicit connections from the hypothesis data structure, and therefore the serving data structure as well. When the hypothesis data structure component 230 determines, with a high level of confidence, that an explicit connection between a sound recording and a composition is incorrect, the connection proposal generator 240 can indicate this to the owner and can, optionally, attach an automatic acceptance feature to this deletion proposal as well.

FIG. 4 is a flow diagram illustrating a method 400 for determining connections between sound recordings to compositions, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by rights management component 140 as shown in FIGS. 1 and 2.

Method 400 begins at block 410 where a processing device maintains a serving structure to represent resources of the content sharing platform and explicit connections between the resources, wherein the resources correspond to sound recording resources and composition resources associated with content items of the content sharing platform. At block 420, the processing device generates a hypothesis structure from the serving structure, the hypothesis structure comprising the resources and the explicit connections of the serving structure and inferred connections between the resources, the inferred connections identified based on data comprised in the resources of the serving structure. The serving structure and the hypothesis structure may be implemented as graph data structures in implementations of the disclosure.

Subsequently, at block 430, the processing device creates a proposal to add at least one of the inferred connections to the serving structure. Lastly, at block 440, the processing device, provides the proposal to an owner corresponding to a composition resource of the resources, the composition resource associated with the inferred connection.

Figure 5:
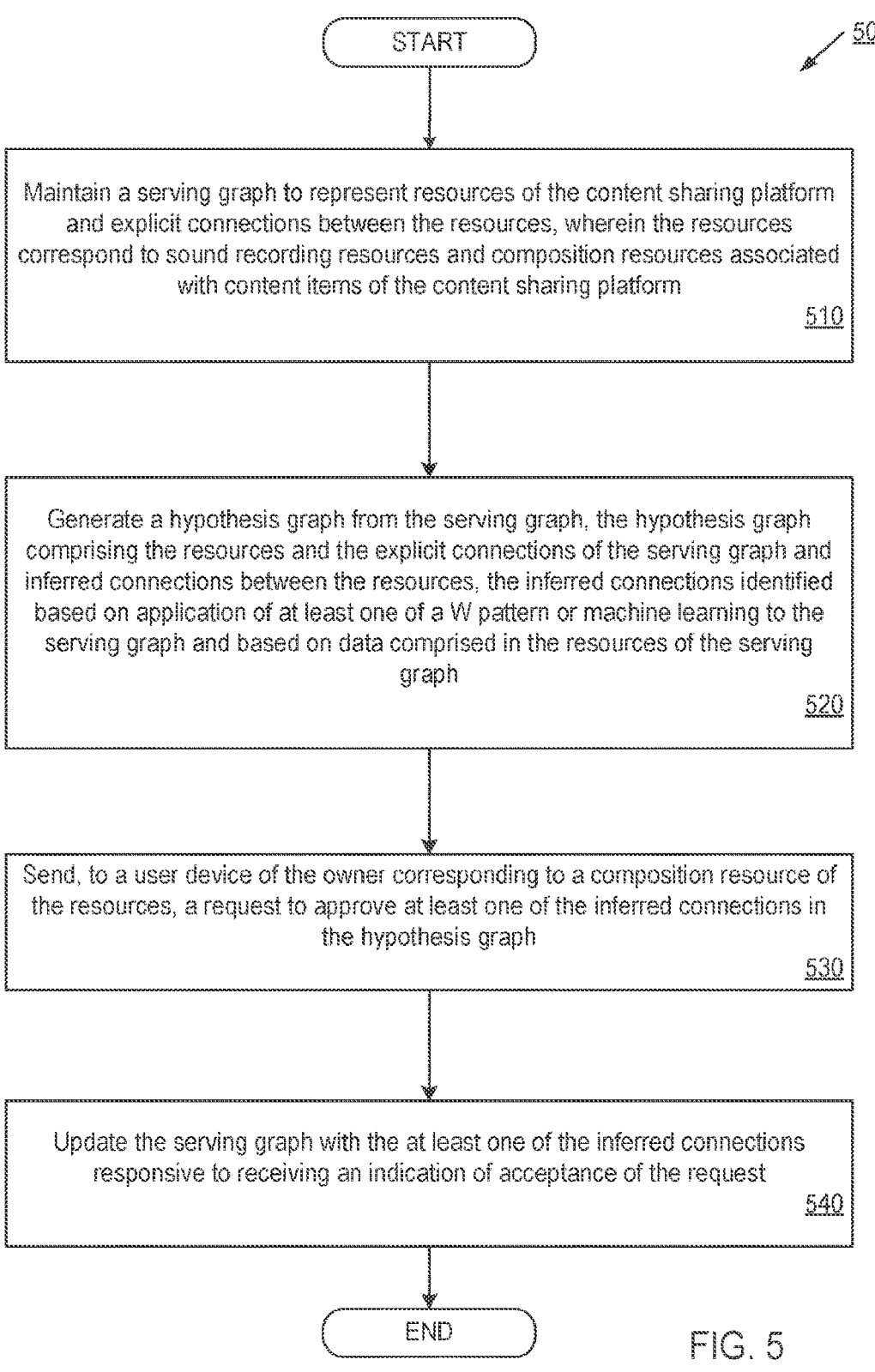
FIG. 5 is a flow diagram illustrating another method for determining connections between sound recordings and compositions, according to an implementation.

FIG. 5 is a flow diagram illustrating another method 500 for determining connections between sound recordings to compositions, according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by rights management component 140 as shown in FIGS. 1 and 2.

Method 500 begins at block 510 where a processing device maintain a serving graph or other serving data structure to represent resources of the content sharing platform and explicit connections between the resources, wherein the resources correspond to sound recording resources and composition resources associated with content items of the content sharing platform. Then, at block 520, the processing device generates a hypothesis graph or other hypothesis data structure from the serving graph/other serving data structure, the hypothesis graph comprising the resources and the explicit connections of the serving graph and inferred connections between the resources. In one implementation, the inferred connections are identified based on application of at least one of a W pattern or a machine learning model to the serving graph. In one implementation, the W pattern includes utilizing common explicit connections of two or more owners to generate proposed connections in a visual "W pattern" or "M pattern" format. In another implementation, the machine learning includes a technique that provides computing devices the ability to learn without being explicitly programmed. Machine learning utilizes a machine learning model that may refer to a model artifact that is created by a training engine using training data that includes training inputs and corresponding target outputs (correct answers for respective training inputs). Furthermore, the inferred connection may be identified based on data comprised in the resources of the serving graph.

Subsequently, at block 530, the processing device sends, to a user device of the owner corresponding to a composition resource of the resources, a request to approve at least one of the inferred connections in the hypothesis graph. Lastly, at block 540, the processing device updates the serving graph with the at least one of the inferred connections responsive to receiving an indication of acceptance of the request. The updated serving graph, or other updated serving data structure, may then be used to, for example, control access to the resources of the content sharing platform, such as the sound recordings and/or the compositions. For example, a rights management component, such as the rights management component 140 of FIGS. 1 and 2 may control access to the resources of the content sharing platform on the basis of the updated serving graph (or other updated serving data structure).

FIG. 6 is a flow diagram illustrating a method 600 for receiving a sound recording to composition connection request at a user device, according to some implementations of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by client device 110A-110Z as shown in FIG. 1.

Method 600 begins at block 610 where a processing device receives, via a graphical user interface (GUI), a request to add an inferred connection between a composition and a sound recording. In one implementation, the inferred connection represented in a hypothesis structure generated from a serving structure representing sound recording resources and composition resources associated with content items of a content sharing platform. In one implementation, the request is the same as the proposal discussed herein. Then, at block 620, the processing device provides, via the GUI, an indication of at least one of acceptance or rejection of the request.

Subsequently, at block 630, the processing device transmits the indication to a server device maintaining the hypothesis structure, the indication to cause at least one of the hypothesis structure or the serving structure to be updated. Lastly, at block 640, the processing device updates the GUI to reflect a result of the request based on the indication.

FIG. 7 is an example screenshot of a sound recording to composition connection request UI 700 according to implementations of the disclosure. UI 700 may be displayed to notify an owner (e.g., a composition owner corresponding to a particular composition resource of a content sharing platform) of a proposed connection between their composition (as represented by the composition resource) and one or more sound recordings of the content sharing platform. In some implementations, the UI 700 may include a composition resource identification portion 701 that includes a composition resource title 702, a resource type 703 (e.g., composition share), and data and time stamp data 704 for when the composition resource was generated. UI 700 may also include a composition resource tab portion 705 including a metadata tab 706, an ownership and policy tab 707, and a sound recordings tab 708. The sound recordings tab 708 is shown as currently selected (e.g., underlined) in UI 700, and may include one or more sound recordings associated with the composition resource. UI 700 may further include a sound recording to composition connection proposal portion 710.

In some implementations, the sound recording to composition connection proposal portion 710 may include an active tab 711, a proposed tab 712, and a declined tab 713. The active tab 711, when selected, may provide identification of one or more sound recordings that are explicitly linked to the composition resource (e.g., the composition resource is embedded in the sounds recordings). The proposed tab 712, when selected, may provide identification of one or more sound recordings that are inferred to be related to the composition resource and have proposals pending to link to generate an explicit link to the composition resource. The declined tab 713, when selected, may provide identification of one or more sounds recordings that were previously proposed to be linked to the composition resource but were declined by the owner.

As shown in UI 700, the proposed tab 712 is currently shown as being selected in the UI 700. As previously discussed, the proposed tab 712 may provide identification of one or more sound recordings that are inferred to be related to the composition resource and have proposals pending to link to generate an explicit link to the composition resource. In one implementation, the sound recording to composition connection proposal generation described with respect to FIGS. 1 through 7 above may be used to generate the proposals provided in proposed tab 712. Proposed tab 712 may include one or more sound recording entries 715A-715N, that each include sound recording identifying information 716, such as a title and creation date, as well as sound recording metadata 717 (e.g., industry identifier, number of claims, daily views, etc.) corresponding to the particular sound recording 715A-715N. Proposed tab 712 may also include a search box 714 to allow a user to input search terms to locate a particular sound recording listed in the proposed tab 712. In addition, the sound recording entries 715A-715N may be arranged based on different criteria (e.g., approximate daily views, etc.) using a sort by element 740 (such as a drop down box to select the criteria to apply to the sound recording entries 715A-715N for ordering purposes).

Each sound recording entry 715A-715N may also include a selection element 720 (such as a check box, etc.) to enable an owner to select the respective sound recording entry 715A-715N. Once selected, the owner may input a decision regarding the proposed connection of the sound recording to the composition resource. The decision may include accepting (e.g., add share) or rejecting (e.g., remove share) the proposal. For example, the user may select the accept element 725 to accept the proposal to link the selected sound recording to the composition resource, or may select the reject element 730 to reject the proposal to link the selected sound recording to the composition resource. The selection element 720 enabled the user to select more than one sound recording entry 715A-715N to apply a decision (i.e., accept or reject) against. As discussed above, in some implementations, an automatic acceptance feature may be configured by the owner to automatically accept proposals after a determined time period has passed, thus bypassing the manual decision process provided via UI 700.

Figure 8:
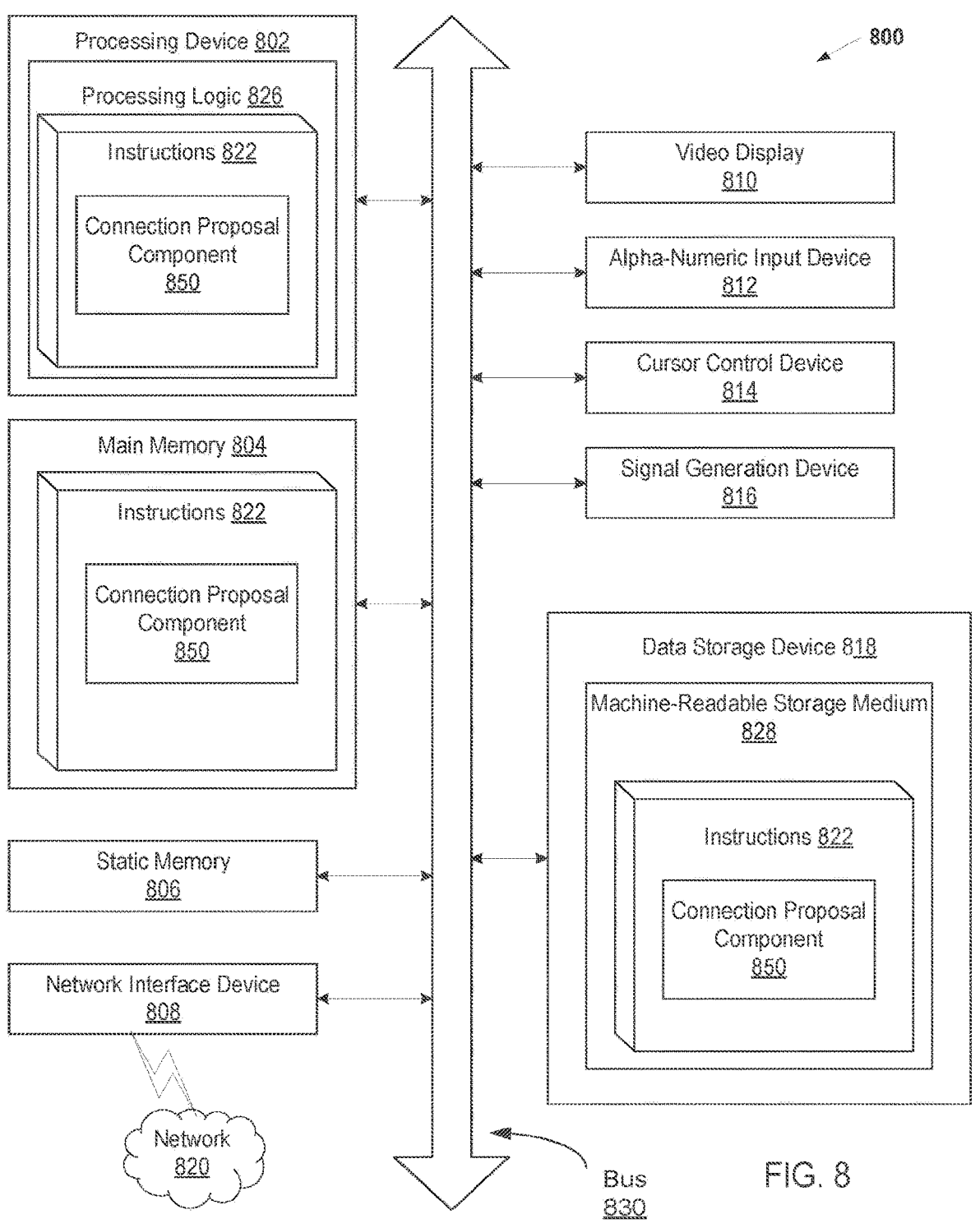
FIG. 8 is a block diagram illustrating one implementation of a computer system, according to an implementation.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 800 may be representative of a server (such as server 130 of FIG. 1) executing a connection proposal component 850, such as connection proposal generator 145, 240, as described with respect to FIGS. 1 and 2.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 (also referred to as a machine-readable storage medium), on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-readable storage media. The instructions 822 may further be transmitted or received over a network 820 via the network interface device 808.

The computer-readable storage medium 828 may also be used to store instructions to perform a method for providing a sound recording to composition connection proposals for a content sharing platform, as described herein. While the computer-readable storage medium 828 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the disclosure. It will be apparent to one skilled in the art, however, that at least some implementations of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure. For example, any feature that is described herein with reference to one aspect or implementation may be provided in any other aspect or implementation.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:

maintaining, by a server device of a content sharing platform, a serving structure to represent resources comprising first resources associated with compositions and second resources associated with sound recordings and explicit connections between the first resources and the second resources, wherein each explicit connection between a first resource of the first resources and a second resource of the second resources indicates that a corresponding first media item is a first composition and a corresponding second media item is a first sound recording of the first composition, wherein the first composition is one of the compositions and the first sound recording is one of the sound recordings;

identifying inferred connections between the compositions and corresponding sound recordings based on data comprised in associated first and second resources of the serving structure;

upon receiving a user approval of at least one of the inferred connections between the compositions and the corresponding sound recordings, adding, by the server device, the at least one of the inferred connections to the serving structure;

identifying one of the explicit connections that is determined to incorrectly connect a composition and a corresponding sound recording;

providing, for presentation to a user device of a user corresponding to one or more resources associated with the identified explicit connection, data specifying the identified explicit connection that is determined to incorrectly connect the composition and the corresponding sound recording; and upon receiving a user request to remove the identified explicit connection that is determined to incorrectly connect the composition and the corresponding sound recording, updating the serving structure to remove the identified explicit connection.

2. The method of claim 1, wherein the resources comprise a container storing at least one of metadata, reference material, ownership information, or policies that correspond to media content items of the content sharing platform.

3. The method of claim 1, wherein the serving structure comprises a graph data structure, and wherein the explicit connections of the serving structure are approved by owners of the resources of the content sharing platform.

4. The method of claim 1, further comprising generating a hypothesis structure based on the serving structure, the hypothesis structure comprising the first and second resources, the explicit connections of the serving structure and the inferred connections between the first and second resources, wherein the hypothesis structure comprises a graph data structure.

5. The method of claim 4, further comprising applying a W pattern to the hypothesis structure to identify the inferred connections.

6. The method of claim 4, further comprising applying a machine learning model to the hypothesis structure to identify the inferred connections.

7. The method of claim 4, wherein generating the hypothesis structure further comprises utilizing metadata from the resources to determine whether to create the inferred connections in the hypothesis structure, the metadata comprising at least one of a title, a writer name, an industry identifier, or an ownership identifier.

8. The method of claim 1, wherein a request to approve an inferred connection is automatically accepted on behalf of an owner of corresponding one or more resources after expiration of a determined time period.

9. The method of claim 8, wherein use of automatic acceptance of the request and the determined time period is configurable via input received from a user device of the owner.

10. The method of claim 1, further comprising:

receiving, from a user device of an owner of corresponding one or more resources, an approval of an inferred connection; and updating the serving structure to comprise the inferred connection as an additional explicit connection in the serving structure.

11. A system comprising:

a memory; and a processing device, coupled to the memory, to perform operations comprising:

maintaining a serving structure to represent resources comprising first resources associated with compositions and second resources associated with sound recordings and explicit connections between the first resources and the second resources, wherein each explicit connection between a first resource of the first resources and a second resource of the second resources indicates that a corresponding first media item is a first composition and a corresponding second media item is a first sound recording of the first composition, wherein the first composition is one of the compositions and the first sound recording is one of the sound recordings;

identifying inferred connections between the compositions and corresponding sound recordings based on data comprised in associated first and second resources of the serving structure;

upon receiving a user approval of at least one of the inferred connections between the compositions and the corresponding sound recordings, adding, by a server device, the at least one of the inferred connections to the serving structure;

identifying one of the explicit connections that is determined to incorrectly connect a composition and a corresponding sound recording;

providing, for presentation to a user device of a user corresponding to one or more resources associated with the identified explicit connection, data specifying the identified explicit connection that is determined to incorrectly connect the composition and the corresponding sound recording; and upon receiving a user request to remove the identified explicit connection that is determined to incorrectly connect the composition and the corresponding sound recording, updating the serving structure to remove the identified explicit connection.

12. The system of claim 11, wherein the resources comprise a container storing at least one of metadata, reference material, ownership information, or policies that correspond to media content items of a content sharing platform.

13. The system of claim 11, wherein the serving structure comprises a graph data structure, and wherein the explicit connections of the serving structure are approved by owners of the resources of a content sharing platform.

14. The system of claim 11, the operations further comprising generating a hypothesis structure based on the serving structure, the hypothesis structure comprising the first and second resources, the explicit connections of the serving structure and the inferred connections between the first and second resources, wherein the hypothesis structure comprises a graph data structure.

15. The system of claim 14, the operations further comprising applying a W pattern to the hypothesis structure to identify the inferred connections.

16. The system of claim 14, the operations further comprising applying a machine learning model to the hypothesis structure to identify the inferred connections.

17. The system of claim 14, wherein generating the hypothesis structure further comprises utilizing metadata from the resources to determine whether to create the inferred connections in the hypothesis structure, the metadata comprising at least one of a title, a writer name, an industry identifier, or an ownership identifier.

18. A non-transitory machine-readable storage medium storing instructions which, when executed, cause a processing device to perform operations comprising:

maintaining a serving structure to represent resources comprising first resources associated with compositions and second resources associated with sound recordings and explicit connections between the first resources and the second resources, wherein each explicit connection between a first resource of the first resources and a second resource of the second resources indicates that a corresponding first media item is a first composition and a corresponding second media item is a first sound recording of the first composition, wherein the first composition is one of the compositions and the first sound recording is one of the sound recordings;

identifying inferred connections between the compositions and corresponding sound recordings based on data comprised in associated first and second resources of the serving structure;

upon receiving a user approval of at least one of the inferred connections between the compositions and the corresponding sound recordings, adding, by a server device, the at least one of the inferred connections to the serving structure;

identifying one of the explicit connections that is determined to incorrectly connect a composition and a corresponding sound recording;

providing, for presentation to a user device of a user corresponding to one or more resources associated with the identified explicit connection, data specifying the identified explicit connection that is determined to incorrectly connect the composition and the corresponding sound recording; and upon receiving a user request to remove the identified explicit connection that is determined to incorrectly connect the composition and the corresponding sound recording, updating the serving structure to remove the identified explicit connection.

19. The non-transitory machine-readable storage medium of claim 18, wherein the resources comprise a container storing at least one of metadata, reference material, ownership information, or policies that correspond to media content items of a content sharing platform.

20. The non-transitory machine-readable storage medium of claim 18, wherein the serving structure comprises a graph data structure, wherein the explicit connections of the serving structure are approved by owners of the resources of a content sharing platform, and wherein a hypothesis structure comprises a graph data structure.

\* \* \* \* \*